UNITED STATES PATENT OFFICE.

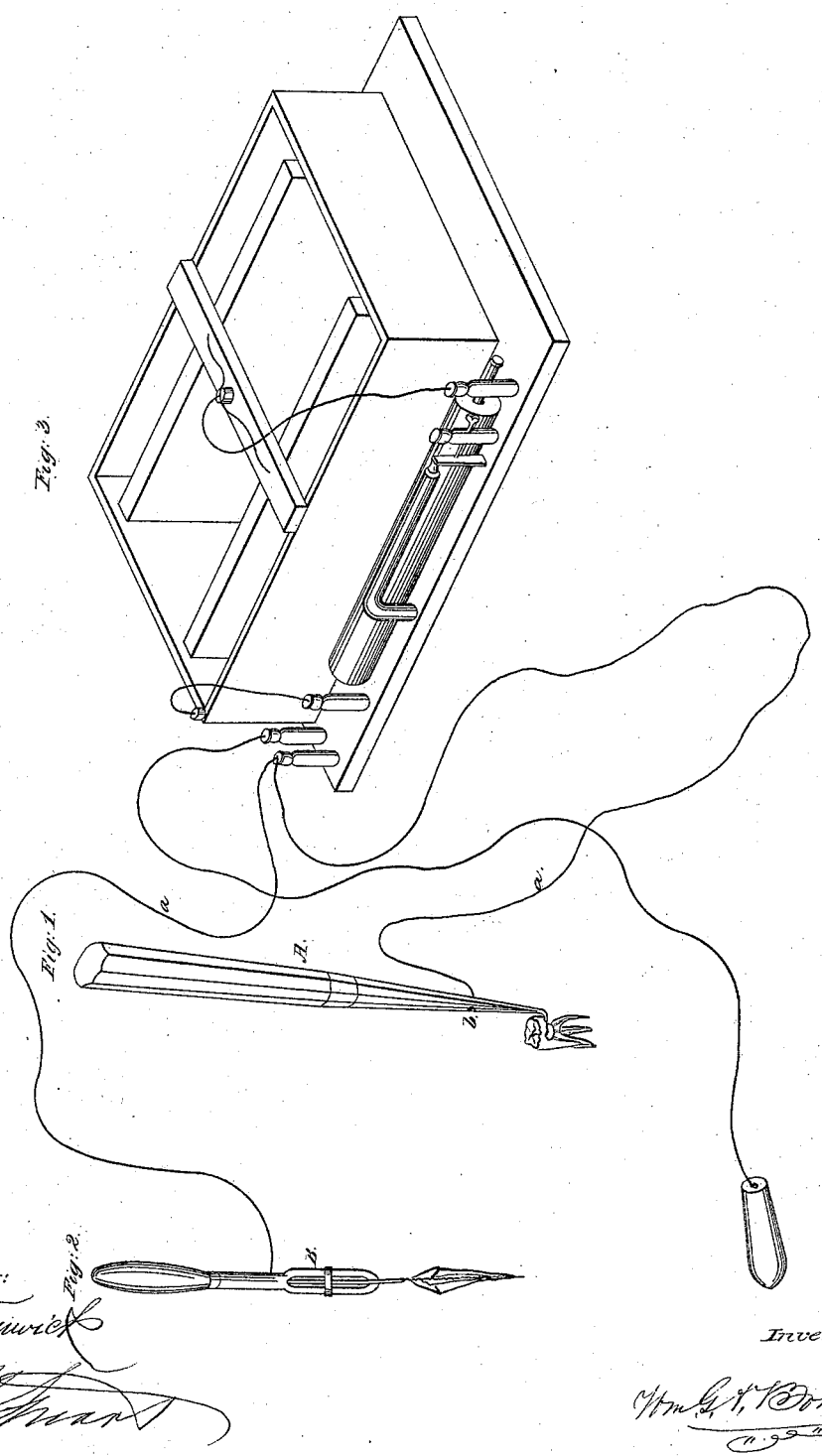

WM. G. A. BONWILL, OF DOVER, DELAWARE.

IMPROVEMENT IN APPLICATION OF ELECTRICITY IN DENTAL OPERATIONS.

Specification forming part of Letters Patent No. 22,851, dated February 8, 1859.

*To all whom it may concern:*

Be it known that I, WM. G. A. BONWILL, of Dover, in the county of Kent and State of Delaware, have invented a new and useful Improvement in Applying Electricity in Extracting or Cutting out the Dental Pulp or Interior Nerve of Decayed Teeth; and I do hereby declare that the following is a full, clear, and exact description of the same, reference being had to the accompanying drawings, forming a part of this specification, in which—

Figure 1 is a perspective view of the dental excavation. Fig. 2 is an edge view of the dental brooch. Fig. 3 is a perspective view of a galvanic battery.

Similar letters of reference in each of the several figures indicate corresponding parts.

My invention consists in the mode hereinafter specified, of extracting or extirpating the dental pulp or internal nerve of teeth, to wit: by the application of a current of electricity through the instruments made use of in the performance of said operation directly and constantly to the internal nerve or dental pulp during the extraction or cutting out of the same.

The object of my invention is to enable the dentist to extract the whole of the interior nerve without the least pain to the patient, and thus avoid the necessity of drawing such teeth as might be successfully filled with gold or other metal, and thus preserved for a number of years in a state which will give the patient no annoyance or pain, which is not the case when arsenic and other escharotics are used to deaden the nerve.

To enable others skilled in the art to make and use my invention, I will proceed to describe its construction and operation.

In the drawings I have represented an ordinary galvanic or electro-magnetic battery for supplying the electric current; but as any other approved form of electrical instrument may be adopted I do not confine myself to its use, and have merely shown it as one means of carrying out my invention.

To extract the dental pulp, or, in common parlance, the "interior nerve" without the least pain to the patient, I attach the wire *a* of the positive pole to the metal part of the dental excavator, A, as shown at *b*, or in any other suitable manner, and apply the wire of the negative pole to the hand or other part of the human body. This being arranged, and the circuit of electricity formed and its power graduated so as to be just strong enough to deaden the interior nerve without producing a shock or giving an unpleasant sensation to that and other surrounding portions of the tooth, I apply the excavator, through which the electricity is passing to the decayed cavity and clear away the carius dentine, so as to fully expose the nerve. This being done, I cut out the main body of the nerve without pain to the patient, as the electric current in passing from the end of the excavator is all the time coming in contact with the nerve and producing its deadening effect thereon. I now lay aside the excavator and apply the electric current to the dental brooch B, which is of screw-form instead of plain, as heretofore used. With the brooch, having the electric current passing through it, I enter the nerve-passages in the fang or root of the tooth and screw out or extract the entire remaining portions of the nerve without pain to the patient, as the electric current in passing from the end of the brooch is always coming in contact with the nerve or moisture of the cavity.

I have described only two dental instruments, as these are all that are generally used in performing the operation of extracting the nerve; but as it may be found necessary, in some cases, in order to extract a nerve perfectly, to use a series of instruments, I do not confine myself to any form or shape of instrument, the gist of my invention being so deadening the interior nerve by the application of electricity directly to the pulp or nerve that the clearing of the decayed cavity, the cutting off of the main body of the nerve, and the extraction of the remaining portions may be accomplished with ease and facility as the nerve is not altered in structure or weakened by the effect of arsenic or other escharotics, and with comparatively no pain or unpleasantness to the patient, as the nerve is insensible to the touch of the instrument.

By the foregoing process of extracting the interior nerve it is believed that in every case where the patient is constitutionally healthy success will follow, for the very reason that the dental pulp, being severed from the main body of nerves at the lowest extremity of the tooth, will heal by the "first intention," and the parts having once been healed the nerve-cavities and external decay leading thereto may be filled with gold or any of the preparations used for such purpose, and the tooth saved from further destruction or kept in a perfectly normal or healthy condition like unto any unaffected tooth, no inflammation or sequent ulcerations of the parts resulting therefrom, as follows: the deadening of the nerve by arsenic and other similar preparations, which mostly leave the surrounding parts in an abnormal state.

I do not claim the application of electricity to dental purposes, as this is shown in the patent of J. B. Francis; but What I do claim as my invention, and desire to secure by Letters Patent, is—

In the application of electricity to dental purposes, the mode herein described of extracting or extirpating the dental pulp or internal nerve of teeth, to wit: by the application of a current of electricity through the instruments made use of in the performance of said operation directly and constantly to the dental pulp or internal nerve during the operation of cutting or extracting the same, as set forth, and for the purposes described.

WM. G. A. BONWILL.

Witnesses:
G. YORK ATLEE,
H. H. YOUNG.